(No Model.) 2 Sheets—Sheet 1.
W. A. PEARSON.
EXPANSION JOINT FOR PIPES.
No. 506,335. Patented Oct. 10, 1893.
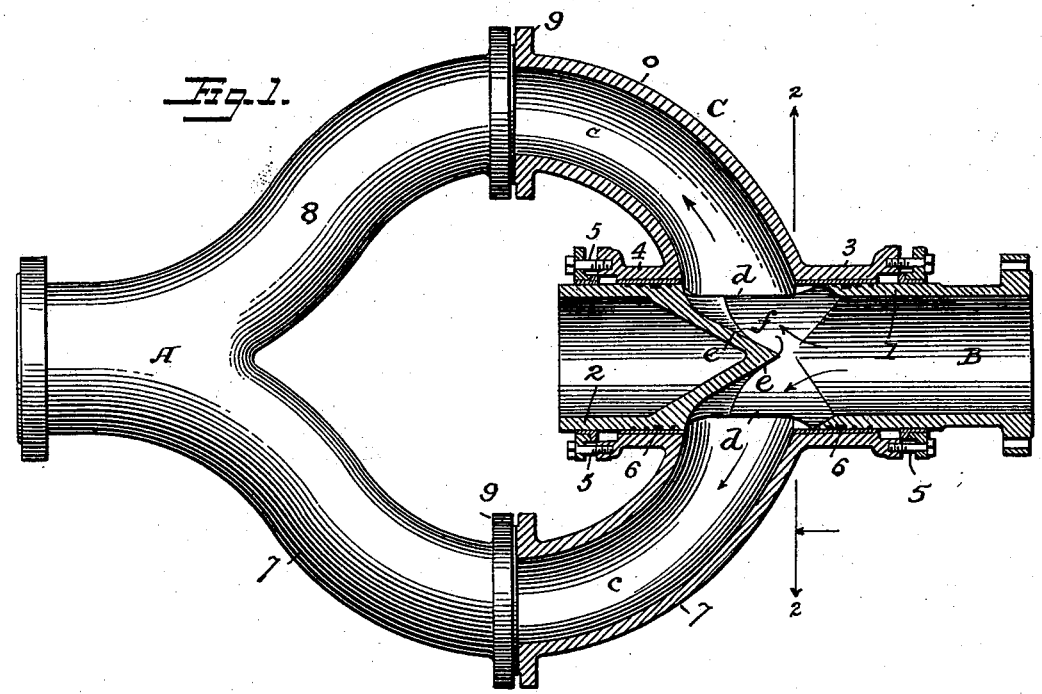
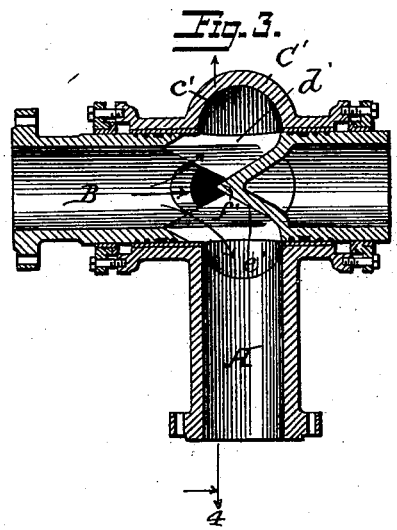
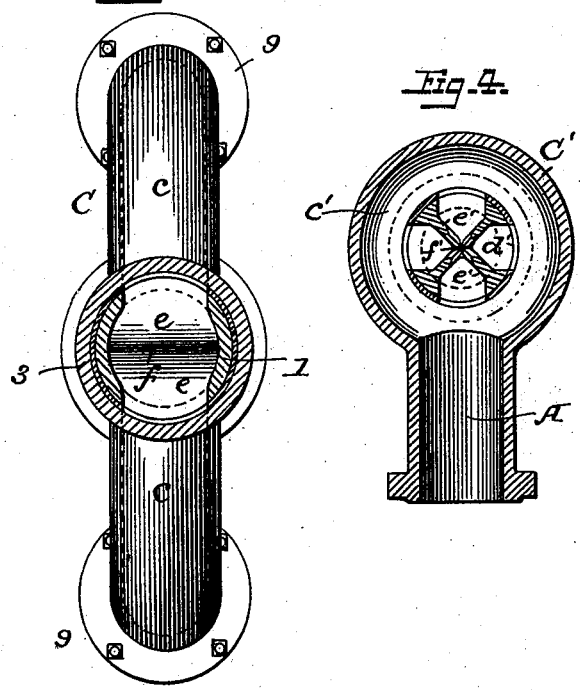
Witnesses
Jno. G. Hinkel
Will E. Neff
Inventor
W. A. Pearson
By J. A. Watson
Attorney

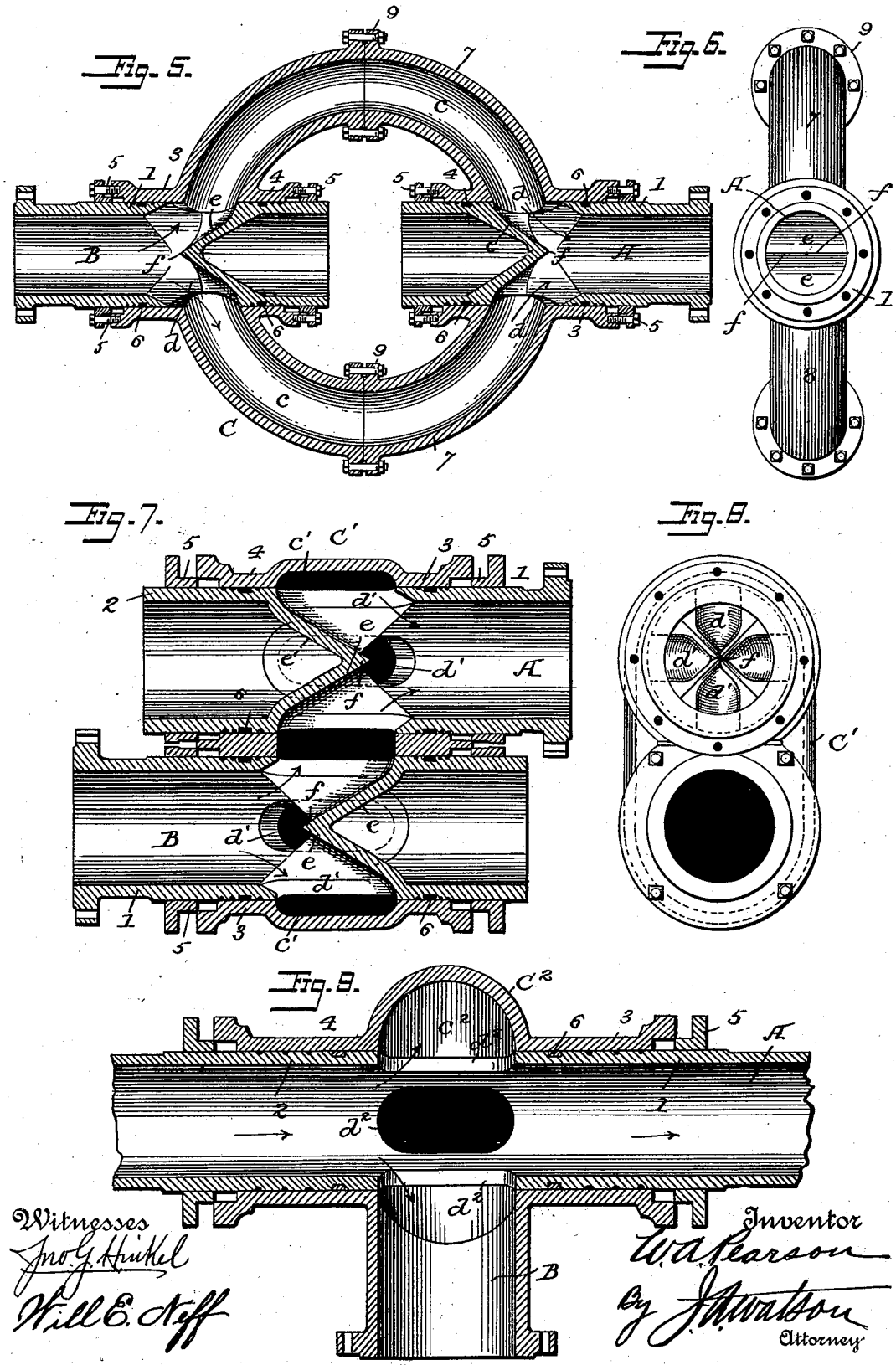

UNITED STATES PATENT OFFICE.

WILLIAM A. PEARSON, OF SCHENECTADY, NEW YORK.

EXPANSION-JOINT FOR PIPES.

SPECIFICATION forming part of Letters Patent No. 506,335, dated October 10, 1893.

Application filed March 2, 1893. Serial No. 464,389. (No model.)

*To all whom it may concern:*

Be it known that I, WILLIAM A. PEARSON, a citizen of the United States, residing at Schenectady, in the county of Schenectady and State of New York, have invented certain new and useful Improvements in Expansion-Joints for Pipes, of which the following is a specification.

My invention relates to expansion joints for pipes, and it consists in an improved joint of which I shall give a full, clear and exact description in the following specification.

In the accompanying drawings, Figure 1 is a partial central sectional view of one form of my improved joint. Fig. 2 is a sectional view on the line 2—2 of Fig. 1. Fig. 3 is a central sectional view of another form of my invention. Fig. 4 is a sectional view of the same, taken on the line 4—4 of Fig. 3. Figs. 5, 7 and 9 are central sectional views of other forms, and Figs. 6 and 8 are end views of the forms shown in Figs. 5 and 7 respectively.

In constructing an expansion joint according to my invention I form one or both of the adjoining ends of the pipe with a pair of pistons having an opening or openings between them, somewhat similar in construction to the pistons of a balanced piston valve, and I join the openings of one pipe section with those of the other, or with the other pipe direct, by passages in a connecting casing, which casing is bored out into cylinders to receive the pistons on the pipe sections. The ends of one or both of the pipes are closed and exposed to the atmosphere so that the pistons are balanced and no strain is brought upon either the pipes or the connecting casing.

Other features of my invention will be described in the following detailed specification.

In the drawings, A, B, indicate the terminal portions of the pipe at the joint, and C the connecting casing. On one or both of the terminal portions is formed cylindrical surfaces 1, 2, which I will term pistons, and these pistons fit within cylinders 3, 4, upon the connecting casing C. Between the pistons 1, 2, are side openings $d$ which communicate with passages $c$ in the casing C. The outer ends of the cylinder portions 3, 4, are preferably provided with stuffing boxes, 5, 5, to make the joints closer, although these may be omitted in some cases. I also find it preferable to provide the cylinders with packing rings 6. The inner ends of one or both of the pipe terminals A, B, (except in Fig. 9) are closed by walls $e$, the inner surfaces of which converge and form wedge shaped points $f$ located centrally of the pipe. This wedge serves to divide the steam current without producing any eddies at the entrance end of the casing and in some cases I bring the passages together at the other end of the casing over a similar wedge point and thus permit the divided current to reunite without forming a vacuum or any disturbing counter currents which would tend to check the flow of the steam.

The casing C in Figs. 1 and 2 consists of two semicircular branches 7 and 8. It will be understood that a single passage through the casing would answer for some purposes and also that the number of branches might be increased to three or four, or a greater number, without departing from the spirit of my invention. I find it most convenient to make this form of casing with two branches united by flanges 9, as shown, although it may be cast in a single piece if desired. In Figs. 1 and 2 a portion of the casing C is formed integral with the terminal portion A of the pipe and the terminal portion B is provided with pistons which work in cylinder portions of the casing. In this form of the invention the pipe sections are in line with each other.

In Figs 3 and 4 my invention is shown as applied to an elbow joint. In these figures the portion A and the casing C′ is cast in one piece. The casing is formed with a passage $c'$ surrounding the piston section B and the latter has four side openings $d'$ which communicate with the passage $c'$. The latter passage opens freely into the terminal section A. This form of my invention will be found convenient where it is necessary to have an elbow and where it is desirable to keep one of the pipes in position and uninfluenced by expansion and contraction.

Figs. 5 and 6 show a form of my invention which is similar to that shown in Figs. 1 and 2 excepting that the connecting casing C is independent of the pipe terminal sections A, B, and both of said sections are provided with pistons and side openings.

In Figs. 7 and 8 I have shown the pipe sections A and B overlapping and parallel with each other. In these views there are four side openings $d'$ in each of the pipe sections which communicate with passages $c'$ in the casing $C'$. The construction of the pipe sections in this form is the same as in the other forms with the exception of the configuration of the wedge. The adjacent openings $d'$ of the two pipe sections communicate directly with each other. The other openings communicate with the passage $c'$ which extends around the outside of the casing and around both of the pipe sections.

In the forms shown in Figs. 1 and 5 there are two side openings and the wall $e$ is in the form of a wedge having an edge running across the pipe at right angles to the plane of the casing. In the remaining forms of my invention there are shown four side openings in the pipe section or sections and the walls $e'$ are cruciform and converge to a wedge point $f'$.

While my invention is primarily intended as a joint for steam pipes, it may be used for pipes designed to convey any other fluid, such as water.

In operation, the fluid entering the section B will be divided by the wedges $f$ or $f'$ and will take the courses marked by the arrows through the casings C or $C'$. The wedges are so constructed as to divide the current of fluid into the proper proportions which should pass through the passages of the casing. In the forms shown in Figs. 1, 5 and 7 the divided streams of fluid come gradually together and unite over wedge points at the opposite side of the casing without forming any vacuum or disturbing counter currents, as will be apparent from the inspection of the drawings. As the ends of the sections provided with piston portions are closed and exposed to the atmosphere these sections become practically balanced pistons and exert no strain upon either the pipes or the casing due to the action of the steam or other fluids passing through them. The side openings are arranged in pairs opposite to each other and any lateral reaction is thereby avoided. It will be evident that my expansion joint may have a wide range of motion and is therefore suitable for long lines of pipe and great variations of temperature.

In Fig. 9 I have shown my invention applied in a modified form as a T-joint. This form can be used in place of an ordinary T where it is desired to have the branch from the pipe stationary. The main pipe $A^2$ is provided with the usual pistons 1, 2, and the casing $C^2$ with cylinders 3, 4. The casing is further provided with a passage $c^2$ surrounding the main pipe A and the latter is provided with openings $d^2$ preferably arranged in pairs to avoid any lateral reaction, the said openings communicating with the passage $c^2$.

In all of the figures the courses of the currents of fluid are indicated by arrows.

Having described my invention, what I claim, and desire to secure by Letters Patent, is—

1. In an expansion joint, the combination with the adjoining end sections of pipe, one of said sections being provided with piston portions and lateral openings between the pistons, and with a transverse wall closing its end, the outer surface of which is exposed to atmospheric pressure, of a casing having cylinder portions corresponding with the pipe section pistons and a passage or passages communicating with the side openings of one pipe section and with the other pipe section, substantially as described.

2. In an expansion joint, the combination with the adjoining sections of pipe, one of said sections being provided with piston portions and lateral openings between the pistons and with a transverse wall, the outer surface of which is exposed to atmospheric pressure and the inner surfaces of which converge and form a wedge which serves to deflect the fluid passing through the pipes out of the side openings, of a casing having cylinder portions corresponding to the pipe section pistons and a passage or passages communicating with the side openings of one pipe section and with the other pipe section, substantially as described.

3. In an expansion joint the combination with a connecting casing having one or more passages and cylinder portions upon both sides of both end openings of said passages, of pipe sections having piston portions adapted to fit the cylinder portions of the casing, said pipe sections having their ends closed and having side openings arranged to communicate with the passages in the casing, substantially as described.

4. In an expansion joint the combination with a connecting casing having one or more passages and cylinder portions upon both sides of both openings of said passages, of pipe sections having piston portions adapted to fit the cylinder portions of the casing, the said pipe sections having their adjacent ends closed by walls, the inner surfaces of which converge and form wedges which serve to deflect the fluid passing through the pipes into the casing passages, substantially as described.

5. The combination with a connecting casing having cylinder portions 3, 4, provided with stuffing boxes 5, of a pipe section having two piston portions 1, 2, provided with packing rings 6, the said pipe section being closed at its inner end by a wall the outer surface of which is exposed to atmospheric pressure, said pipe section being provided with side openings arranged to communicate with the passages of the connecting casing, substantially as described.

In testimony whereof I affix my signature in presence of two witnesses.

WILLIAM A. PEARSON.

Witnesses:
 WM. G. SCHERMERHORN,
 ABEL S. CLEMENTS.